(12) United States Patent
Thomsen

(10) Patent No.: US 8,766,467 B2
(45) Date of Patent: Jul. 1, 2014

(54) WIND TURBINE WITH A GENERATOR

(75) Inventor: Thyge Skovbjerg Thomsen, Herning (DK)

(73) Assignee: Siemens Aktiengesellschaft, Munich (DE)

( * ) Notice: Subject to any disclaimer, the term of this patent is extended or adjusted under 35 U.S.C. 154(b) by 59 days.

(21) Appl. No.: 13/401,920

(22) Filed: Feb. 22, 2012

(65) Prior Publication Data

US 2012/0217751 A1     Aug. 30, 2012

(30) Foreign Application Priority Data

Feb. 25, 2011   (EP) ...................................... 11156045

(51) Int. Cl.
*F03D 9/00* (2006.01)
(52) U.S. Cl.
USPC ............................................................ 290/44
(58) Field of Classification Search
USPC ............................................. 290/44, 43, 54
See application file for complete search history.

(56) References Cited

U.S. PATENT DOCUMENTS

| 2,847,590 | A | * | 8/1958 | Clark et al. | 310/70 R |
|---|---|---|---|---|---|
| 8,248,039 | B2 | * | 8/2012 | Cao et al. | 322/37 |
| 8,319,390 | B2 | * | 11/2012 | Snitchler et al. | 310/216.097 |
| 2003/0011348 | A1 | * | 1/2003 | Lof et al. | 322/37 |
| 2004/0207208 | A1 | | 10/2004 | Christenson | |
| 2010/0320763 | A1 | * | 12/2010 | Li et al. | 290/44 |
| 2010/0327585 | A1 | * | 12/2010 | Cao et al. | 290/44 |
| 2011/0109279 | A1 | * | 5/2011 | Li et al. | 322/99 |

FOREIGN PATENT DOCUMENTS

| EP | 1768223 A2 | 3/2007 |
|---|---|---|
| EP | 2141788 A2 | 1/2010 |
| EP | 2280166 A1 | 2/2011 |
| WO | WO 2010083903 A2 | 7/2010 |
| WO | WO 2010108928 A1 | 9/2010 |

* cited by examiner

*Primary Examiner* — Jean F Duverne

(57) ABSTRACT

A wind turbine with a generator is provided. The wind turbine includes a rotor comprising permanent magnets; a stator comprising stator coils mounted in or on a stator housing structure; a generator contactor electrically connected to the stator and to a converter, the generator contactor disposed in or on the stator housing structure.

9 Claims, 1 Drawing Sheet

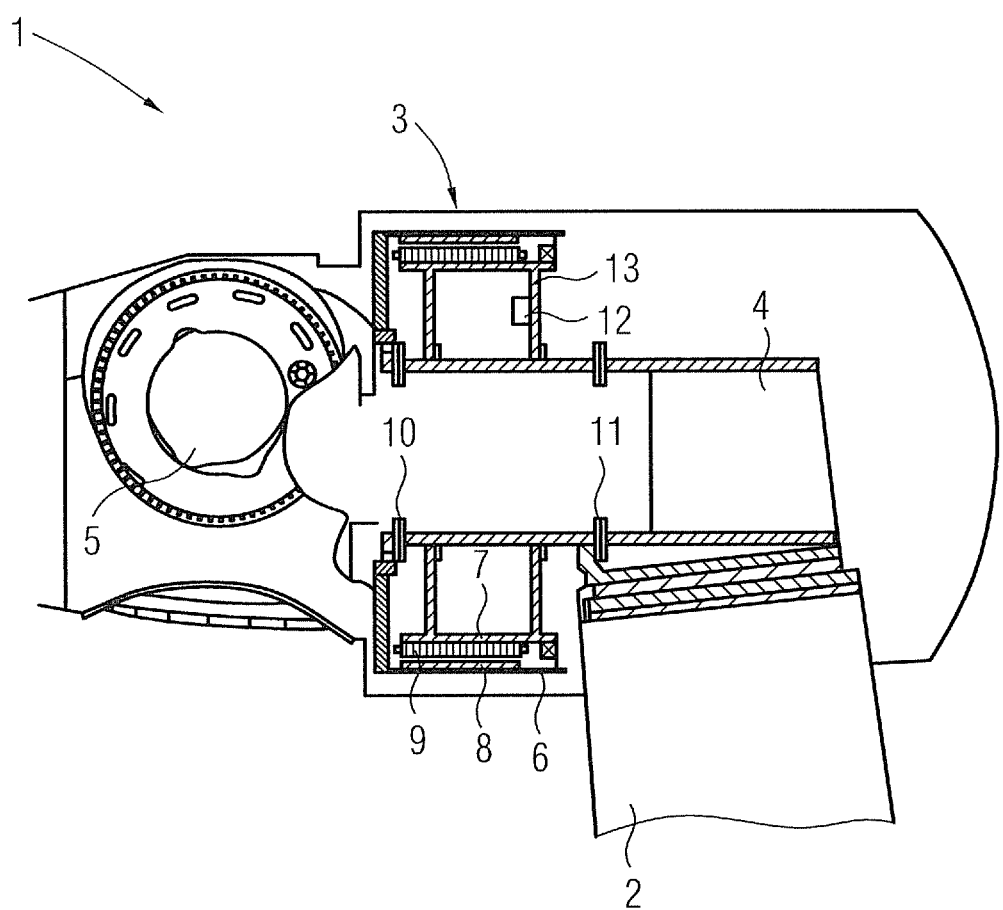

WIND TURBINE WITH A GENERATOR

CROSS REFERENCE TO RELATED APPLICATIONS

This application claims priority of European Patent Office application No. 11156045.4 EP filed Feb. 25, 2011. All of the applications are incorporated by reference herein in their entirety.

FIELD OF INVENTION

The present invention relates to a wind turbine with a generator, comprising a rotor comprising permanent magnets, a stator comprising stator coils mounted in or on a stator housing structure, at least one generator contactor with an input and an output set of terminals electrically connected to the stator by said input terminal and at least one converter electrically connected to the generator contactor by said output terminals.

BACKGROUND OF INVENTION

Wind turbines which operate with variable rotational speed may comprise an indirect grid connection where AC current from the generator with variably frequency can be converted to AC current with a fixed frequency of the utility grid.

The conversion is usually done by a rectifier conversion into direct current (AC/DC) followed by a controlled inverter conversion into a fixed frequency (DC/AC). Accordingly the generator of the wind turbine is connected to a rectifier which is connected to an inverter producing the AC current which is needed for a power grid. Commonly the conversion of DC into AC in the inverter can be done by using either thyristors or transistors. One advantage of this indirect grid connection is that it is possible to run the wind turbine at variable speed allowing the rotor to vary in speed thereby adapting to the aerodynamic conditions.

In EP 1 768 223 A2 a wind turbine is disclosed using converter modules. The converter module comprises a generator contactor for disconnecting the generator from the electronics of the converter modules. The converter module also comprises an inductor for smoothing the generator current, a generator inverter for transforming the AC signal from the generator to a DC signal, a DC link capacitor for smoothing out variations for the DC signal, a break chopper for dissipation of residual power, a grid inverter for transforming the DC signal into an AC signal, and an inductor which in combination with capacitors serves to reduce harmonics of the voltage signal being applied to the utility grid. The converter module further comprises a charge resistor for charging the DC link capacitor when the charge contactor is closed, a grid contactor for disconnecting the utility grid from the electronics of the converter module and a circuit breaker for disconnecting the utility grid from the converter module in case of an overcurrent.

In WO 2010/083903 A2 a wind turbine comprising a generator contactor for disconnecting the generator from the electronics of the converter module is disclosed. The generator contactor is mounted in receiving spaces of the rotating magnet wheel housing.

SUMMARY OF INVENTION

Accordingly in common generators for wind turbines at least a part of the electrical system is not voltage free when the rotor is turning. It is therefore an object of the present invention to provide a wind turbine where the connection between the contactor and the converters can be kept voltage free.

According to the present invention this object is achieved in the above defined wind turbine in that the at least one generator contactor is disposed in or on the stator housing structure.

The invention is based on the idea that it is advantageous to position the generator contactor in the generator as the contactor is thereby physically directly connected to the stator windings and thereby the connection between the contactor and the converters is kept voltage free when the contactor is switched off no matter if the generator produces power. Even further by placing the generator contactor in the generator stationary stator housing structure the wire length between the stator coils and the contactor is minimised.

In the inventive wind turbine at least one generator contactor may be disposed on a receiving surface and/or a receiving space in or on the stator housing structure. Accordingly the present invention relates to an alternative construction of a wind turbine generator where the generator contactor is mounted in the generator assembly and not in the converter cabinets as known from prior art.

In the inventive wind turbine the rotor permanent magnets may be mounted on a magnet wheel that is rotatable around the stator. The use of a stationary stator which is surrounded by the rotor enables to position the generator contactor in the stator housing structure.

In order to further improve the safety of the wind turbine it may be envisaged that the generator contactor comprises circuit breakers. Such circuit breakers are used for disconnecting the generator from the utility grid in case of an overload or any other technical failure.

According to a further development of the inventive wind turbine it may comprise a means for locking the circuit breakers in an open position. This means is particularly useful when work is being undertaken at the generator. The means for locking the circuit breakers avoids that the circuit breakers are connected and switched on unintentionally.

Further the means for locking the circuit breakers may comprise a remote locking device which makes it possible to install a circuit breaker without the condition of keeping the front of the circuit breaker accessible for locking in an open position. Furthermore it is ensured that a circuit breaker can be installed in a limited space.

In order to improve the accessibility of the electric components of the inventive wind turbine the circuit breakers can be installed such that terminals are accessible in a main cable terminal box.

BRIEF DESCRIPTION OF THE DRAWINGS

The invention and its underlying principle will be better understood when consideration is given to the following detailed description of a preferred embodiment.

The FIGURE is a schematic sectional view of the main components of an inventive wind turbine.

DETAILED DESCRIPTION OF INVENTION

The FIGURE illustrates a nacelle 1 of a wind turbine. A wind turbine tower 2 which is depicted partly is connected to a generator 3 via a "swan neck" frame 4. A hub 5 is connected to the upper side of the generator 3, rotor blades are mounted on the hub 5.

Generator 3 is of the direct drive type with an outer rotor 6 and an inner stator 7, whereby the hub 5 is directly connected to rotor permanent magnets 8. The stator 7 and stator coils 9 of the generator 3 are connected to the swan neck frame 4 through bolted connections 10, 11.

As can be seen in the FIGURE a generator contactor 12 is disposed on a stator housing structure 13 supporting the stator coils 9. It is noted that plural contactors 12 can be provided in or on the stator housing structure 13.

Due to the fact that the generator contactor 12 is mounted in the generator stationary stator housing structure 13 the contactor 12 is thereby physically directly connected to windings of the stator 7 and thereby the connection between the contactor 12 and converters (not shown) is kept voltage free when the contactor 12 is switched off. Even when the generator 3 produces power said electrical connection is voltage free so that the risk of an unintentional contact with current-carrying lines is minimised.

As can be seen in the FIGURE the distance between the stator coil 9 and the contactor 12 is quite small, therefore the wire length is minimised.

In one embodiment of the wind turbine the generator contactor comprises circuit breakers which are equipped with lock cylinders or brackets for applying one or more padlocks. This means is used for locking the circuit breakers in an open position to ensure that the downstream circuit is isolated in a secure way and to allow work on the electrical circuit or on the equipment supplied by the circuit breakers.

In one embodiment of the wind turbine the generator contactor circuit breakers comprises a remote locking device for the circuit breaker which makes it possible to install a circuit breaker without the condition of keeping the front of the circuit breaker accessible for locking in open position. Hereby it is furthermore ensured that it is possible to install a circuit breaker in a limited space, namely in a permanent magnet synchronous generator with the terminals at the backside of the circuit breaker accessible in a main cable terminal box.

The invention claimed is:

1. A wind turbine with a generator, comprising
a rotor comprising permanent magnets;
a stator housing structure;
a stator comprising stator coils mounted in or on the stator housing structure, the stator housing structure supporting the stator coils;
a converter; and
a generator contactor which is switched between an off state and an on state and which is disposed in or on the stator housing structure and electrically connected to the stator, the generator contactor includes an output terminal electrically connected to the converter, the generator contactor switched in the off state keeps the connection between the contactor and converter voltage free even when the generator produces power,
wherein the generator contactor comprises circuit breakers effective to disconnect the generator from a utility grid during a technical failure, and
wherein a locking device is provided, the locking device effect to lock the circuit breakers in an open position.

2. The wind turbine according to claim 1,
wherein the generator contactor is disposed on a receiving surface or a receiving space in or on the stator housing structure.

3. The wind turbine according to claim 1,
wherein the generator contactor is disposed on a receiving surface and a receiving space in or on the stator housing structure.

4. The wind turbine according to claim 1,
wherein the rotor permanent magnets are mounted on a magnet wheel that is rotatable around the stator.

5. The wind turbine according to claim 1,
wherein the generator contactor comprises a remote locking device for the circuit breakers.

6. The wind turbine according to claim 1,
wherein the circuit breakers are installed such that terminals are accessible in a main cable terminal box.

7. The wind turbine according to claim 1,
wherein the contactor is physically directly connected to windings of the stator.

8. The wind turbine according to claim 7,
wherein the connection between the contactor and converter is voltage free when the contactor is switched off.

9. The wind turbine according to claim 1,
wherein the connection between the contactor and converter is voltage free when the contactor is switched off

* * * * *